H. H. ROUSH.
BEE-HIVE.
No. 178,959.  Patented June 20, 1876.
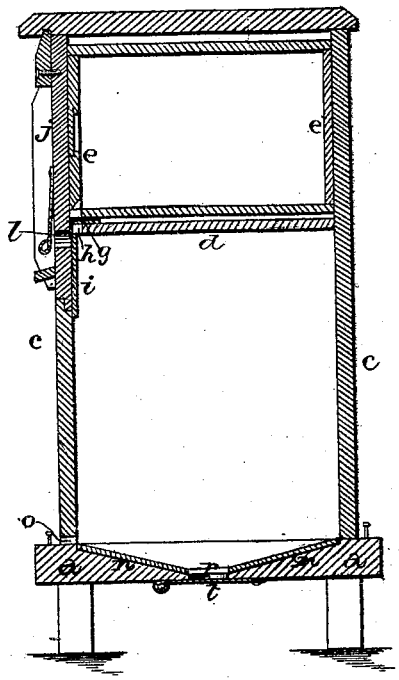
WITNESSES.
J. Wm Garner
R. M. Barr
INVENTOR:
H. H. Roush
per
F. A. Lehmann, Atty

UNITED STATES PATENT OFFICE.

HENRY H. ROUSH, OF SIAM, IOWA.

IMPROVEMENT IN BEE-HIVES.

Specification forming part of Letters Patent No. 178,959, dated June 20, 1876; application filed May 4, 1876.

*To all whom it may concern:*

Be it known that I, HENRY H. ROUSH, of Siam, in the county of Taylor and State of Iowa, have invented certain new and useful Improvements in Bee-Hives; and I do hereby declare the following to be a full, clear, and exact description of the invention, such as will enable others skilled in the art to which it pertains to make and use it, reference being had to the accompanying drawings, which form part of this specification.

My invention relates to an improvement in bee-hives; and it consists in the peculiar arrangement and combination of parts that will be more fully described hereinafter, whereby the moths are prevented from getting into the hive, and a cheap, simple, and effective hive produced.

The accompanying drawings represent my invention.

$a$ represents the bench upon which the hive $c$ is placed. In practice this bench will be made long enough to hold any number of hives desired, though it is here shown as holding only one. The hive is divided by a partition, $d$, into two parts, into the upper one of which is placed the honey-box $e$, while the lower part is for the bees to raise their brood in. By this division the bees are never interfered with while removing the honey, and as they live in this chamber entirely they have the better chance to overcome any of their enemies which may get access into the hive. The communication between the honey-box and the lower chamber can be closed at will by a small tin slide, $g$, which slides over the hole $h$, when the honey can be removed without the fear of the bees. The upper part of the lower chamber is covered by a plate of glass, $i$, and then over this and the whole side of the upper chamber is placed the door or cover $j$, through which is made an opening, $l$, for the bees, just opposite the opening $h$ into the honey-box. By the removal of this cover not only can the honey-box be removed, but the condition of the honey and bees seen at any time desired. In the surface of the bench there is cut a square recess, $n$, of just the size of the hive, that sits over it, and the four sides of this recess form four inclined dovetail-shaped surfaces, all of which are covered with glass.

Moths or millers enter at the opening $o$, and being unable to walk on glass they slide down the inclines to the hole $r$ through the bench, and which hole is kept closed by a slide, $t$, from below. In the morning by moving the slide to one side these moths or millers will fall through to the ground, or into the hand, when they can be destroyed.

Having thus described my invention, I claim—

1. The floor of a bee-hive constructed with a recess, the surface of which is covered or faced with glass or analogous material, as set forth.

2. A four-sided inclined recess, $n$, made in the bench $a$, the sides of which recess are covered with glass, in combination with the hole $r$ and door $t$, substantially as described.

In testimony that I claim the foregoing I have hereunto set my hand this 22d day of April, 1876.

HENRY H. ROUSH.

Witnesses:
SIMEON SMITH,
ALBERT DYCH.